United States Patent
Rowls et al.

[11] 3,775,730
[45] Nov. 27, 1973

[54] CORROSION-PROOF BATTERY TERMINAL AND CABLE CONNECTOR THEREFOR

[75] Inventors: Garth A. Rowls, Muncie, Ind.; Elbert L. Johnson, Warren, Ohio

[73] Assignee: General Motors Corporation, Detroit, Mich.

[22] Filed: Nov. 5, 1971

[21] Appl. No.: 196,026

Related U.S. Application Data

[63] Continuation of Ser. No. 799,666, Feb. 17, 1969, abandoned.

[52] U.S. Cl. ........ 339/116 R, 339/60 C, 339/218 R, 339/231
[51] Int. Cl. ............................................. H01r 11/26
[58] Field of Search ................. 339/28, 92, 94, 60, 339/116, 201, 218, 231, 232, 263; 136/133, 135, 168

[56] References Cited
UNITED STATES PATENTS

| | | | |
|---|---|---|---|
| 1,960,200 | 5/1934 | Beetem | 339/115 R X |
| 2,066,597 | 1/1937 | West | 339/115 R X |
| 1,338,130 | 4/1920 | Hazelett | 339/232 X |
| 1,120,554 | 12/1914 | Snyder | 339/116 X |
| 1,014,718 | 1/1912 | Parsons | 339/29 |
| 1,284,746 | 11/1918 | Morrison | 136/81 |
| 1,951,591 | 3/1934 | Anzalone et al. | 339/116 X |
| 3,413,593 | 11/1967 | Schaefer | 339/116 |

FOREIGN PATENTS OR APPLICATIONS

| | | | |
|---|---|---|---|
| 418,768 | 10/1934 | Great Britain | 136/135 R |
| 634,025 | 3/1950 | Great Britain | 136/135 |

Primary Examiner—Richard E. Moore
Attorney—William S. Pettigrew et al.

[57] ABSTRACT

A side-terminal battery and cable connector therefor, which terminal is sealed in a case wall and includes a threaded socket having a sealing groove thereabout and which connector includes an elastomeric cap, a projection for sealingly mating with the groove around the terminal, a bolt for seating in the terminal socket turn-resistant means for preventing rotation of the connector and a second seal between the bolt and the cap.

18 Claims, 6 Drawing Figures

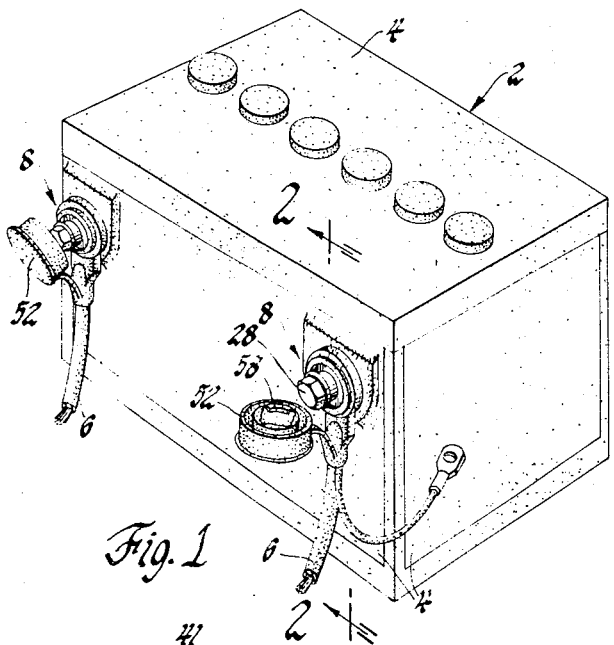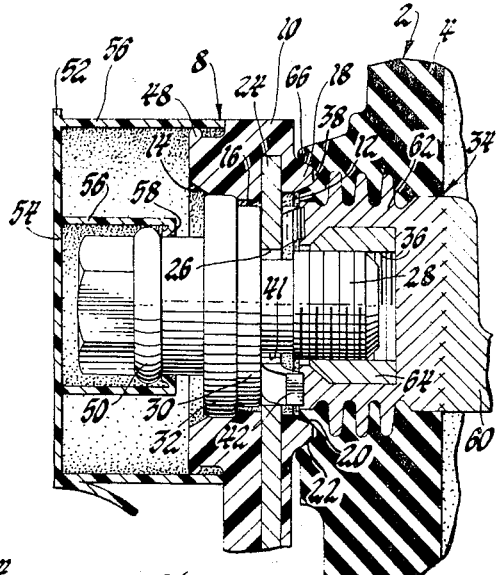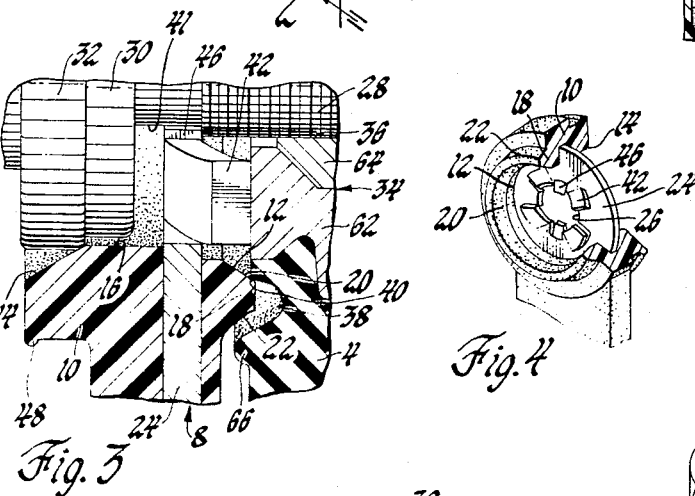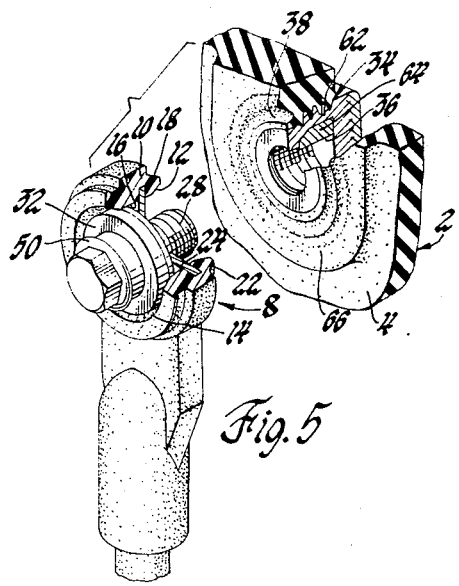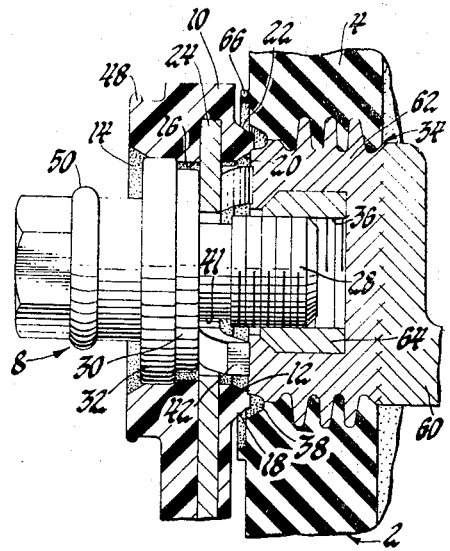

CORROSION-PROOF BATTERY TERMINAL AND CABLE CONNECTOR THEREFOR

This is a Continuation of application Ser. No. 799,666 filed Feb. 17, 1969, now abandoned, in the name of Rowls et al and assigned to the assignee of this application.

This invention relates primarily to electric storage batteries, especially lead-acid storage batteries for automotive vehicle applications. More particularly, this invention relates to batteries having side terminals and cable connectors therefor which shield the electrical junction between the terminal and connector from environmental corrosive attack.

Battery terminal corrosion is a major contributor to cranking failures during engine startup. Terminal corrosion results from a number of factors, including roadsplash, salt, battery acid condensate generated during charging and air-borne corrosive ingredients common to many industrial and seaboard areas. Many of the corrosive materials are also ionic conductors which, when allowed to accumulate on the top of a battery, form an ionic bridge or short circuit path between the battery terminals. This short circuit reduces the power available to the ignition circuit and increases the self-discharge rate of the battery. No commercially practical and sufficiently effective structure has been proposed which eliminates these corrosion and short circuit problems. Accordingly, in the past, it has been considered sound maintenance practice to periodically clean the battery terminals and flush the top of the battery.

It is an object of this invention to provide a corrosion-proof and short-circuit-eliminating battery terminal and cable connector therefor, the structure and location of which isolates and protects the electrical junction between the terminal and the connector from the principal avenues of environment corrosive attack and short-circuiting inroads.

This and other objects and advantages of this invention will become more apparent from the detailed description which follows:

This invention comprehends, among other features, an annular tongue-in-groove, interference-fit type seal between a deformable elastomeric projection or lip and a substantially rigid sealing edge, which seal circumscribes the principal electrical junction between the cable connector and battery terminal. This circumscribing seal prevents corrosive attack of the terminal from the lateral direction and when used in combination with terminals located on the side of the battery, ionic bridging between the electrodes is virtually eliminated. The circumscribing projection or lip and sealing edge are so structured that a seal is always provided regardless of variation from one unit to the next because of manufacturing tolerance variations. This side terminal location prevents the formation of ionic bridges or short circuits resulting from the accumulation on a bettery top of battery acid condensate or fall-out generated during battery charging. A second seal is provided between a flange on the connector bolt and the elastomeric connector cap. The second seal isolates the electrical junction from airborne and/or splash corrodents attacking from other than the lateral direction. A lockwasher effect is created by the back bias of the elastomer on the flange which insures a sound connection. Turn-resistant means are provided to prevent rotation of the cable with respect to the battery which could otherwise damage the battery or break the seals in the sense of rendering them ineffectual. Still further benefits are obtained when these terminals and connectors are located on the side of the battery. Such benefits include less exposure to battery acid condensate and/or fall-out, reduced IR drop between the cell groups and the terminal, increased flexibility for the automotive designer with respect to the location of the battery in an engine compartment where head room is a major design consideration, shorter battery cables, and the overall aesthetic appearance of the battery. Still further aspects of this invention include raised lips circumscribing the battery terminal for preventing direct shorting of the battery when the terminals are collocated on the same side of a case. A cover is provided to protect all exposed corrodible elements of the connector.

DRAWINGS

FIG. 1 is a perspective view of a side-terminal battery within the scope of this invention.

FIG. 2 is a sectional view taken in the direction 2—2 of FIG. 1 and shows the connector near the maximum seal condition.

FIG. 3 is an enlarged view of the lateral seal just prior to full seating of the connector in the terminal.

FIG. 4 is a partially sectioned perspective view of the terminal-contacting face of the cable connector.

FIG. 5 is a partially exploded, partially sectioned, perspective view of the battery terminal and connector of this invention.

FIG. 6 is another embodiment of this invention and shows the connector near the minimum seal condition.

In the following description, like reference numerals identify the several like parts in the several drawings. FIG. 1 depicts a battery 2 in which the several battery elements or cells are appropriately arranged in a container defined by walls 4. The battery terminals are collocated on a common side wall and have cables 6 connected thereto by means of cable connectors 8.

FIG. 2 best depicts a fully seated cable connector 8 as it would appear if viewed along the lines 2—2 of FIG. 1 and includes the cover 52 as it would appear when in place for use. The connector 8 comprises a cap 10 formed of an acid-resistant elastomeric material such as polyvinyl chloride. The cap 10 has two open ends 12 and 14 and an opening 16 extending between the ends. On the first open end 12, which contacts the battery, there is formed a tapered annular projection or lip 18. The annular projection or lip 18 is defined by an inner wall 20 and an outer wall 22. The inner wall 20 defines the void space, or hollow, which comprises the open end 12. This hollow has the shape of a truncated cone in which the narrowest portion of the cone is nearest the center of the connector and the widest portion farthest from the center and nearest the battery. A terminal 34 comprises a plug 62 which passes through and sealingly engages the battery wall 4. In a preferred form, the case wall is molded around the plug 62 to form a composite molding. The plug 62 has a turn-resistant and anti-extraction outside configuration which becomes anchored in the wall. The terminal 34 contains a threaded socket 36 which receives a bolt 28 from the connector 8. The socket 36 is most conveniently formed by casting the plug 62 about an internally threaded core 64 (e.g., a steel hex nut). The hex configuration of the nut 64 resists rotation of the nut within the plug 62. An annular groove 38 circumscribes the socket 36 leaving the end of the plug 62 on the outside of the case projecting, like a mesa, above the surrounding material at the bottom of the groove 38. The groove may be formed in the wall material 4 (FIG. 2) or as part of the plug 62 (FIG. 6). The innermost edge 40 is the principal sealing edge of the groove 38 and is formed at the intersection of the face of the mesa and the inner wall of the groove 38. The sealing edge 40 of the groove 38 and the inner wall 20 of the projection 18 cooperate to form the principal lateral seal. The nature of the cooperation is such that a reliable seal will always be formed regardless of the precise dimensions of either the annular projection 18 or sealing edge 40 which will both vary from unit to unit within the range of manufacturing and molding tolerances. The consistent reliable seal is insured by providing the hollow of the open end 12 with a conical shape as indicated. In all cases then there will be at least a continuous line-contact seal between the walls 20 and the edge 40 even though the depth of insertion of the projection 18 into the groove 38 will vary from assembly to assembly. In some cases, the projections 18 will seat deep in the groove 38 in order to effect the seal (see FIG. 2). In other cases, the seal will be effected near the leading edge of the projection 18 (see FIG. 6). Regardless of the precise location thereof, a reliable seal will nonetheless always be formed regardless of minor dimensional variations from one battery or connector to the next within normal manufacturing tolerances. As a design point and since the projection 18 is deformable, it is preferred to make the diameter of the sealing edge 40 about 0.005 inch larger than the lowest acceptable tolerance value for the wider portion of the conical hollow but in no case larger than about 0.010 inch larger. With the drawing-down and tightening of the bolt 28 an interference fit between the edge 40 and the wall 20 results. If the diameter of the sealing edge 40 exceeds the large diameter portion of the conical hollow by more than about 0.010 inch, the end of the projection butts against the battery wall and an unreliable seal is formed as compared to the seal resulting from seating of the projection 18 in the groove 38 and deformation of elastomer about the sealing edge 40 which results in the preferred seal of this invention. The depth of the groove 38 is sufficient to insure at least line-contact between the sealing edge 40 and the inner wall 20. That portion of the plug 62, which is inwardly of the battery container, is attached to the plate straps 60, by burning, welding or the like.

An electrically conductive contact element 24 is provided in the opening 16 and is partially embedded in the cap 10. The contact element 24 has an aperture 26 (see FIG. 4) therein through which a hold-down bolt 28 extends. The contact element 24 has locking tabs 46 extending into the aperture 26. These locking tabs 46 loosely engage a recess 41 in the bolt 28 to prevent the bolt from being separated from the cable connector. The tabs 46 are conveniently formed by a crimping or staking operation.

The bolt 28 has a first flange 30 and a second flange 32. Upon tightening the bolt 28, the first flange engages the contact element 24 and draws the connector into tight engagement with the battery terminal. Turn-resistant tangs 42 on the contact element 24 bite into the terminal and lock the connector against rotation which could both break the seal and/or damage the battery terminal. The second flange 32 is drawn deeply into and sealingly engages the conically shaped hollow which forms the second open end 14. The resilient nature of the elastomeric material comprising the cap 10 deforms about the flange 32 to provide the seal. The resilient material resists penetration of the second flange 32 into the opening 16 and sets up a back-bias or lock-washer effect, which holds the bolt 28 and prevents its working loose during use.

FIG. 3 depicts the general relation of the respective parts prior to their being drawn into tight sealing engagement with the battery case. As can be readily seen, the tangs 42 do not bite into the plug 62 and the projection 18 just barely contacts the sealing edge 40. Likewise, the second flange 32 just begins to engage the elastomeric material surrounding the second open end 14. Upon tightening the bolt 28, the tangs 42 bite into the plug 62, the projection 18 deforms about the sealing edge 40, and the second flange 32 seats itself firmly in the conically shaped second open end 14 of the cap 10.

Among the other features shown in FIG. 2 there is depicted the situation wherein a maximum seal is effected. This maximum seal results when the projection 18 is fully seated in and substantially fills the groove 38 and the sealing edge 40 is well down into the narrower portion of the hollow. Among the other features shown in FIG. 6 there is depicted the situation where the minimum seal is effected and only the wider portion of the hollow engages the sealing edge 40. In either case, a highly reliable acceptable seal is formed as long as at least a substantial line-contact is made between the edge 40 and the wall 20. Of course, a deeper insertion of the projection 18 into the groove 38 produces a greater surface contact between the members and provides a better seal. The groove 38 may be formed in the material which forms the case wall 4 (FIG. 2), or it may be formed completely in or as a part of the plug 62 (FIG. 6).

As best shown in FIGS. 2, 3 and 6, an annular boss 66 is formed in the case well 4 and projects slightly above or in front of the respective terminals. The boss 66 is provided as a means to prevent the direct short circuiting of the battery when the terminals are collocated on a common side such as shown in FIG. 1.

A cover 52 is provided to completely isolate all corrosion-sensitive parts. The cover 52 comprises a web 54 and concentric flanges 56 extending therefrom which form inner and outer concentric cylinders. The inner cylinder has a plurality of fingers 58 projecting inwardly. The fingers 58 snap over and engage a knob 50 on the bolt 28, to hold the cover in place over the connector 8. An annular lip 48 is provided at the end 14 of the cap 10. The lip 48 engages the outer cylinder in the manner indicated and provides additional protection.

While we have disclosed our invention primarily in terms of a specific embodiment thereof, we do not intend to be limited thereto, except to the extent hereinafter defined.

We claim:

1. A battery and cable connector therefor, said connector comprising a noncorroding, elastomeric cap having first and second open ends and an opening between said ends, an annular sealing projection protruding from said first end, said projection being defined by inner and outer walls, said inner wall also defining a truncated cone-shaped hollow at said first open end the cross sectional diameter of which hollow increases from a minimum near the center of the cap to a maximum farthest from the center of the cap, an apertured, electrically conductive contact element in said opening between said ends and at least partially embedded in said cap, a threaded bolt having a first flange engaging said element, said bolt extending through said element and said opening for securing said connector to said battery, said battery including a wall at least partially defining a container, a conductive terminal passing through and in sealing engagement with said wall, an outwardly facing portion of said terminal having an interiorly threaded socket engaging said threaded bolt, an annular groove including a sealing edge surrounding said socket and engaging said projection on said cap, the diameter of said groove at said edge being at least equal to said minimum diameter of said hollow and not substantially more than said maximum diameter of said hollow and the depth of said groove being sufficient to insure at least line-contact between said sealing edge and said inner wall of said projection to universally provide a seal between said connector and said terminal regardless of minor dimensional variations from one connector to the next and one terminal to the next, which seal protects said terminal from environmental corrosive attack.

2. A battery and cable connector therefor, said connector comprising a noncorroding, elastomeric cap having first and second open ends and an opening extending between said ends, an annular sealing projection protruding from said first end, said projection being defined by inner and outer walls, said inner wall also defining a truncated cone-shaped hollow at said first open end, the cross sectional diameter of which hollow increases from a minimum near the center of the cap to a maximum farthest from the center of the cap, an apertured electrically conductive contact element in said opening between said ends and at least partially embedded in said cap, said element including opposing turn-resistant tangs in biting engagement with the terminal of said battery to resist rotation of said connector with respect to said battery, a threaded bolt having a first flange engaging said element, said bolt extending through said element and said opening for securing said connector to said battery, said battery including a wall at least partially defining a container, a conductive terminal passing through and in sealing engagement with said wall, an outwardly facing portion of said terminal having an interiorly threaded socket engaging said threaded bolt, an annular groove including a sealing edge surrounding said socket and engaging said projection on said cap, the diameter of said groove at said edge being at least equal to said minimum diameter of said hollow and not substantially more than said maximum diameter of said hollow and the depth of said groove being sufficient to insure at least line-contact between said sealing edge and said inner wall of said projection to universally provide a seal between said connector and said terminal regardless of minor dimensional variations from one connector to the next and one terminal to the next which seal protects said terminal from environmental corrosive attack.

3. A battery and cable connector therefor, said connector comprising a noncorroding, elastomeric cap having first and second open ends and an opening extending between said ends, an annular sealing projecting protruding from said first end, said projection being defined by inner and outer walls, said inner wall also defining a first truncated cone-shaped hollow at said first open end the cross sectional diameter of which hollow increases from a minimum near the center of the cap to a maximum farthest from the center of the cap, said second open end comprising a second truncated cone-shaped hollow the cross sectional diameter of which increases from a minimum near the center of the cap to a maximum farthest from the center of the cap, an apertured electrically conductive contact element in said opening between said ends and at least partially embedded in said cap, said element including opposing turn-resistant tangs in biting engagement with the terminal of said battery to resist rotation of said connector with respect to said battery, a threaded bolt having a first flange engaging said element and a second flange sealingly engaging said cap in said second hollow, said bolt extending through said element and said opening for securing said connector to said battery, said battery including a side wall defining a case, a conductive terminal passing through and in sealing engagement with said wall, an outwardly facing first portion of said terminal having an interiorly threaded socket engaging said threaded bolt, an annular groove including a sealing edge surrounding said socket and engaging said projection on said cap, the diameter of said groove at said edge being at least equal to said minimum diameter of said first hollow and not substantially more than said maximum diameter of said first hollow and the depth of said groove being sufficient to insure at least line-contact between said sealing edge and said inner wall of said projection to universally provide a seal between said connector and said terminal regardless of minor dimensional variations from one connector to the next and one terminal to the next which seal protects said terminal from environmental corrosive attack.

4. The battery and cable connector as defined in claim 3 wherein said second end of said cap includes a radially extending annular lip, said bolt has an annular knob adjacent said second flange, and said connector includes a cover comprising a web and at least two annular concentric flanges extending from said web and defining inner and outer concentric cylinders, the inner cylinder having inwardly extending fingers engaging said knob to secure said cover to said bolt while said outer cylinder engages said lip to provide additional protection for said terminal.

5. The battery and cable connector as defined in claim 3 wherein said bolt includes an annular recess between said first flange and said threads, and said conductive element includes locking tabs extending into said aperture and said recess for loosely retaining said bolt in said aperture.

6. A cable connector for the terminal of a lead-acid storage battery, said connector comprising a noncorroding, elastomeric cap having first and second open ends and an opening between said ends, an annular sealing projection protruding from said first end and adapted to be received in a mating annular groove circumscribing said terminal, said projection being defined by inner and outer walls, said inner wall also defining a first truncated cone-shaped hollow at said first open end the cross sectional diameter of which hollow increases from a minimum near the center of the cap to a maximum farthest from the center of the cap, said inner wall being adapted to engage a sealing edge of said groove, said second open end comprising a second truncated cone-shaped hollow the cross sectional diameter of which increases from a minimum near the center of the cap to a maximum farthest from the center of the cap, an electrically conductive contact element having an aperture therein in said opening between said ends and at least partially embedded in said cap, said element including opposing turn-resistant tangs for bitingly engaging said terminal of said battery to resist rotation of said connector with respect to said battery, a threaded bolt having a first flange for engaging said element and a second flange for sealingly engaging said cap in said second hollow, said bolt extending through said aperture and said opening in said cap for securing said connector to a threaded socket in said battery terminal.

7. A battery case including a conductive terminal forming a part of at least one wall of said case; said terminal comprising a conductive plug passing through and in intimate, sealing contact with an aperture-defining surface in the remainder of said wall; said plug having an inner end inside said case to fuse to the battery's electrochemical elements and an outer end outside said case to join to a battery cable connector; said plug having an interiorly threaded socket recessed in said outer end to engage a threaded bolt on said connector; said wall having an annular groove surrounding said socket and defining a terminal face including said outer end; and said groove providing a sealing edge with said face and being adapted to receive a tapered, annular elastomeric sealing projection on said connector such that said edge engages said sealing projection in an interference-fit seal around said socket to substantially isolate said face and said socket from corrosive environmental attack when joined with said connector regardless of minor dimensional variations from one connector to the next and one terminal to the next.

8. A battery and connector assembly comprising: a battery case having a plurality of walls defining a compartment for electrochemical cell elements; a conductive plug integral with and forming a part of at least one of the side walls of the battery, which plug extends through and is in sealing engagement with the remainder of the side wall; one end of the plug facing outwardly of the case and forming a terminal of the battery; the other end of the plug facing said compartment; electrochemical cell elements in the compartment; strap means joining said elements; a fused connection between the strap means and the other end of the plug; an internally threaded socket in the one end; an annular groove in said wall having a sealing edge surrounding the socket; terminal connector means including a non-corroding cap, a threaded bolt extending through said cap and an annular, tapered, elastomeric lip on the cap surrounding the bolt; a sealing surface on the tapered lip; said lip and said groove mating in tongue-in-groove fashion such that the sealing edge of the groove engages the sealing surface of the elastomeric lip in an interference-fit seal around the socket regardless of minor dimensional variations from one cap to the next and one groove to the next, which seal protects the terminal from corrosive enviornmental attack.

9. A battery and detachable connector assembly comprising: a battery case having a plurality of walls defining a compartment for electrochemical cell elements; a conductive plug integral with and forming a part of at least one of the side walls of the battery, which plug extends through and is in sealing engagement with the remainder of the side wall, the remainder of the side wall being nonconductive; one end of the plug facing outwardly of the case and forming a terminal of the battery; the other end of the plug facing said compartment; electrochemical cell elements in the compartment; strap means joining said elements; a fused connection between the strap means and the other end of the plug; an internally threaded socket in the one end; an annular groove in said wall forming a sealing edge surrounding the socket; terminal connector means including a non-corroding cap, a threaded bolt extended through said cap and an annular, tapered, elastomeric lip on the cap surrounding the bolt; a sealing surface on the tapered lip; said lip and said groove mating such that the sealing edge of the groove engages the sealing surface of the lip in an interference-fit seal around the socket regardless of minor dimensional variations from one cap to the next and one groove to the next, which seal protects the terminal from corrosive environmental attack.

10. The battery and connector assembly as defined in claim 9 wherein the sealing edge is formed on the conductive plug.

11. The battery and connector assembly as defined in claim 9 wherein the sealing edge is formed on a portion of the remainder of the wall which surrounds the conductive plug.

12. A battery comprising: a battery case having a plurality of walls defining a compartment; electrochemical cell elements including strap means in the compartment; a conductive plug integral with and forming a part of at least one of the side walls of the battery, which plug passes through and is in intimate sealing contact with an aperture-defining surface in the remainder of the side wall, the remainder of the side wall being nonconductive; one end of the plug having a face thereon on the outside of the case forming a terminal of the battery which is adapted to engage a battery cable connector having a non-corroding cap and an annular, tapered, elastomeric lip and sealing surface on said cap; the other end of the plug facing said compartment; a fused connection between the strap means and said other end of the plug; an internally threaded socket in said one end adapted to engage a threaded bolt extending through said cap substantially centrally of said lip; an annular groove in said wall forming a sealing edge surrounding the socket adapted to engage the sealing surface of the lip in an interference-fit seal around the socket to protect said face and said socket from corrosive environmental attack when engaged with said connector regardless of minor dimensional variations from one cap to the next and one groove to the next.

13. A battery having a case including a conductive terminal forming a part of at least one wall of said case and electrochemical elements in said case; said terminal comprising a conductive plug passing through and in intimate sealing contact with an aperture-defining surface in the remainder of said wall; said plug having an inner end inside said case and fused to said electrochemical elements and an outer end outside said case to join to a battery cable connector; said plug having an interiorly threaded socket recessed in said outer end to engage a threaded bolt on said connector; said wall having an annular groove surrounding said socket and defining a terminal face including said outer end; and said groove providing a sealing edge with said face and being adapted to receive a tapered, annular elastomeric sealing projection on said connector such that said edge engages said sealing projection in an interference-fit seal around said socket to protect said face and said socket from corrosive environmental attack when joined with said connector regardless of minor dimensional variations from one connector to the next and one terminal to the next.

14. A cable connector for the terminal of a storage battery, said connector comprising: a non-corroding, elastomeric cap having open ends and an opening between said ends, an annular sealing projection protruding from one of said ends and adapted to be received in an annular groove circumscribing said terminal; said projection having an inner wall defining a first truncated cone-shaped hollow the cross sectional diameter of which increases from a minimum near the center of the cap to a maximum farthest from the center of the cap, and adapted to engage a sealing edge of said groove in an interference-fit; an electrically conductive contact element having an aperture therein in said opening between said ends and at least partially embedded in said cap; said element including turn-resistant tangs for bitingly engaging said terminal of said battery to resist rotation of said connector with respect to said battery; a threaded bolt extending through said aperture and having a flange for engaging said element and substantially sealing-off said aperture and said terminal when said bolt securely engages a threaded socket in said battery terminal.

15. A battery having a terminal so located and so adapted to complement a cable-connector for the terminal that corrosive attack of the terminal by battery acid condensate and air-borne corrodants is substantially reduced, said battery comprising: a case having a plurality of walls defining a compartment for the battery's electrochemical cell elements and including vertical walls where battery acid condensate does not collect; electrochemical cell elements in said compartment; one of said vertical walls including a conductive portion and a nonconductive portion, the said conductive portion passing through the nonconductive portion such that the portions are in intimate, liquid-tight contact one with the other; the conductive portion having an outer terminal-side forming said terminal and an inner cell-side joined to the cell elements; a fused connection adjacent the nonconductive portion joining the conductive portion's cell-side to the cell elements; the terminal-side having a face thereon; an internally threaded socket in said face adapted to engage a threaded bolt on a battery cable connector; an annular groove in said one wall; a cable-connector-engageable edge surrounding the socket and along the circumferential periphery of said face where the face meets said groove; said edge being adapted for interference-fit engagement with an annular tapered elastomeric lip on the cable-connector to protect the face and the socket from corrosive environmental attack when engaging the cable-connector regardless of minor dimensional variations from one groove to the next and one connector to the next.

16. A battery as claimed in claim 15 wherein said one vertical wall includes at least two terminals of opposite polarity and the faces of the terminals are recessed beneath the outermost part of said nonconductive portion to prevent accidental electrical bridging of the terminals and direct short circuiting of the battery.

17. The battery as defined in claim 15 wherein the sealing edge is on the conductive portion of the wall.

18. The battery as defined in claim 15 wherein the sealing edge is on the nonconductive portion of the wall.

* * * * *